United States Patent
Aramburo et al.

(10) Patent No.: US 10,639,617 B2
(45) Date of Patent: May 5, 2020

(54) PROCESS FOR PRODUCING LPG FROM A HEAVY HYDROCARBON FEED

(71) Applicant: SABIC Global Technologies B.V., Bergen op Zoom (NL)

(72) Inventors: Luis Aramburo, Geleen (NL); Maikel van Iersel, Den Bosch (NL); Dustin Farmer, Houston, TX (US); Scott A. Stevenson, Houston, TX (US); Emiel van Kimmenade, Geleen (NL)

(73) Assignee: SABIC Global Technologies B.V., Bergen op Zoom (NL)

( * ) Notice: Subject to any disclaimer, the term of this patent is extended or adjusted under 35 U.S.C. 154(b) by 100 days.

(21) Appl. No.: 15/762,797

(22) PCT Filed: Sep. 15, 2016

(86) PCT No.: PCT/EP2016/071857
§ 371 (c)(1),
(2) Date: Mar. 23, 2018

(87) PCT Pub. No.: WO2017/055096
PCT Pub. Date: Apr. 6, 2017

(65) Prior Publication Data
US 2018/0280944 A1    Oct. 4, 2018

(30) Foreign Application Priority Data

Sep. 30, 2015  (EP) .................................... 15187650

(51) Int. Cl.
*B01J 29/12*   (2006.01)
*C10G 47/18*   (2006.01)
*B01J 29/08*   (2006.01)

(52) U.S. Cl.
CPC ............ *B01J 29/126* (2013.01); *C10G 47/18* (2013.01); *B01J 2029/081* (2013.01); *B01J 2229/16* (2013.01); *B01J 2229/186* (2013.01); *B01J 2229/42* (2013.01)

(58) Field of Classification Search
CPC .... B01J 29/12; B01J 29/126; B01J 2029/081; B01J 2229/16; B01J 2229/186; B01J 2229/42; C10G 47/18
USPC ......................................................... 502/66
See application file for complete search history.

(56) References Cited

U.S. PATENT DOCUMENTS

| | | | |
|---|---|---|---|
| 3,640,819 A | 2/1972 | Watkins | |
| 3,801,497 A | 4/1974 | Benner | |
| 4,738,941 A | 4/1988 | Dufresne et al. | |
| 5,342,507 A | 8/1994 | Dai et al. | |
| 7,326,332 B2 | 2/2008 | Chen et al. | |
| 7,513,988 B2 | 4/2009 | Oballa et al. | |
| 8,709,378 B2 | 4/2014 | Lee | |
| 8,962,900 B2 | 2/2015 | Kim et al. | |
| 2007/0062848 A1 | 3/2007 | Oballa et al. | |
| 2007/0267324 A1 | 11/2007 | Dalloro et al. | |
| 2009/0314683 A1 | 12/2009 | Matsushita | |
| 2010/0160699 A1 | 6/2010 | Frey et al. | |
| 2018/0265796 A1 | 9/2018 | Aramburo et al. | |
| 2018/0273857 A1 | 9/2018 | Aramburo et al. | |
| 2018/0028638 A9 | 10/2018 | Aramburo et al. | |

FOREIGN PATENT DOCUMENTS

| | | |
|---|---|---|
| WO | 2005080532 A1 | 9/2005 |
| WO | 2014122620 A1 | 8/2014 |
| WO | 2015128018 A1 | 9/2015 |
| WO | 2015128033 A1 | 9/2015 |

OTHER PUBLICATIONS

De Jong et al., "Zeolite Y Crystals with Trimodal Porosity as Ideal Hydrocracking Catalysts," Angew. Chem. Int. Ed. 2010, 49, 10074-10078.
European Search Report from the European Patent Office for European Application No. 15187650; Date of Completion: Mar. 23, 2016; 2 pages.
International Search Report for International Application No. PCT/EP2016/071857; Date of Completion: Dec. 12, 2016; dated Dec. 20, 2016; 2 Pages.
Kaduk, et al.(Crystal Structure of Zeolite Y as a Function of Ion Exchange, The Rigaku Journal, 1995, vol. 12, No. 2; 1995.
Karge et al., "Molecular Sieves: Science and Technology," vol. 3, (2002) pp. 204-255.
Kirk-Othmer Encyclopedia of Chemical Technology, "Molecular Sieves," (2006) pp. 811-853, Fifth Edition, vol. 16.
Ma et al, "Coupled hydrogenation and ring opening of tetralin on potassium modified Pt/USY catalysts," Catalysis Letters, vol. 116, Nos. 3-4, Aug. 2007, pp. 149-154.
Raichle et al., "Haag-Dessau Catalysts for Ring Opening of Cycloalkanes," Angew. Chem. Int. Ed. 2001, 40, No. 7, pp. 1243-1246.
Simanzhenkov et al., "Technology for Producing Petrochemical Feedstock from Heavy Aromatic Oil Fractions," Ind. Eng. Chem. Res. 2010, 49, 953-963, 11 Pages.
Written Opinion of the International Searching Authority for International Application No. PCT/EP2016/071857; Date of Completion: Dec. 12, 2016; dated Dec. 20, 2016; 5 Pages.
Zecevic et al., "Heterogeneities of the Nanstructure of Platinum/Zeolite Y Catalysts Revealed by Electron Technology," ACS Nano, 2013, 7(4), pp. 3698-3705.
Cesana et al., "Conversion of Heavy Aromatic Hydrocarbons to Valuable Synthetic Feed for Steamcrackers," Oil and Gas European Maganzine Feb. 2008, pp. 89-94.

*Primary Examiner* — Edward M Johnson
(74) *Attorney, Agent, or Firm* — Cantor Colburn LLP

(57) ABSTRACT

A process comprising contacting said feed in the presence of hydrogen with a M/zeolite catalyst under hydrocracking process conditions.

19 Claims, No Drawings

PROCESS FOR PRODUCING LPG FROM A HEAVY HYDROCARBON FEED

CROSS REFERENCE TO RELATED APPLICATIONS

This application is a 371 of International Application No. PCT/EP2016/071857 filed Sept. 15, 2016, which claims priority to European Application No. 15187650.5, filed Sept. 30, 2015, both of which are incorporated by reference in their entirety herein.

The present invention relates to a process for producing LPG from a hydrocarbon feed comprising polyaromatics, the process comprising contacting said feed in the presence of hydrogen with a M/zeolite catalyst under hydrocracking process conditions.

Processes for producing LPG from heavy hydrocarbon feeds have been previously described. For instance, WO2005/080532 describes a process for the production of linear alkanes containing less than 6 carbon atoms which comprises putting a mixture comprising one or more hydrocarbons containing at least 6 carbon atoms, in contact with a catalytic composition comprising:
a) at least one element Me selected from Zn, Mo, Cu, Ga, In, W, Ta, Zr, Ti, metals of group VIII Fe, Co, Ni, Ru, Rh, Pd, Os, Ir, Pt,
b) a zeolite selected from Y-zeolite and Y-zeolite modified by partial or total substitution of the Si with Ti or Ge and/or partial or total substitution of the aluminum with Fe, Ga or B,
with the exclusion of a catalytic composition comprising at least one lanthanide, at least one metal belonging to group VIII and a zeolite selected from Y-zeolite and Y-zeolite modified by partial or total substitution of the Si with Ti or Ge and/or partial or total substitution of the aluminum with Fe, Ga or B when the mixture treated is a mixture containing aromatic compounds. The process of WO2005/080532 is characterized in that it produces a relatively high amount of fuel gas. Moreover, the process of WO2005/080532 has a relatively low selectivity for C3 and C4 hydrocarbons.

It was an object of the present invention to provide an improved process which allows the selective conversion of a heavy hydrocarbon feedstock comprising polyaromatics to LPG and which has a low selectivity towards unwanted side-products such as methane and/or aromatic hydrocarbons such as BTX. Furthermore, it was an objective of the present invention to provide a process for producing LPG from heavy hydrocarbon feeds which has an improved selectivity for C3 and C4 hydrocarbons.

The solution to the above problem is achieved by providing the embodiments as described herein below and as characterized in the claims. Accordingly, the present invention provides a process for producing LPG from a hydrocarbon feed comprising more than 30 wt-% polyaromatics, the process comprising contacting the feed in the presence of hydrogen with a M/zeolite catalyst at a pressure of 65-150 bara, a temperature of 350-500° C., a WHSV of 0.1-10 h$^{-1}$ and a H$_2$/HC ratio of 1-20, wherein said M/zeolite catalyst comprises:
0.05-2.5 wt-% of element M, wherein said element M is one or more elements selected from Group 10 of the Periodic Table of Elements; and
an aluminosilicate zeolite having a pore size of 6-8 Å and a SiO$_2$/Al$_2$O$_3$ ratio of 50-120.

In the context of the present invention, it was surprisingly found that by specifically selecting the M/zeolite catalyst of the present invention having a pore size of 6-8 Å and a SiO$_2$/Al$_2$O$_3$ ratio of 50-120 and selecting a pressure of 65-150 bara, a temperature of 350-500° C., a WHSV of 0.1-10 h$^{-1}$ and a H$_2$/HC ratio of 1-20 as process conditions, a heavy hydrocarbon feed comprising polyaromatic hydrocarbon compounds can be more efficiently converted to LPG. Particularly, the production of unwanted side products such as C5-C9 hydrocarbons and/or mono-aromatic hydrocarbons can be reduced by selecting the catalyst in combination with the process conditions of the present invention over the known process as described in WO2005/080532.

The term "aromatic hydrocarbons" or "aromatics" is very well known in the art. Accordingly, the term "aromatic hydrocarbon" relates to cyclically conjugated hydrocarbon with a stability (due to delocalization) that is significantly greater than that of a hypothetical localized structure (e.g. Kekulé structure). The most common method for determining aromaticity of a given hydrocarbon is the observation of diatropicity in the 1H NMR spectrum, for example the presence of chemical shifts in the range of from 7.2 to 7.3 ppm for benzene ring protons. As used herein, the term "polyaromatics" or "polyaromatic hydrocarbons" relates to a mixture of aromatic hydrocarbons having more than one aromatic ring. As used herein, the term "monoaromatic hydrocarbons" or "monoaromatics" relates to a mixture of aromatic hydrocarbons having only one aromatic ring.

The term "BTX" as used herein relates to a mixture of benzene, toluene and xylenes. As used herein, the term "C# hydrocarbons", or "C#", wherein "#" is a positive integer, is meant to describe all hydrocarbons having # carbon atoms. Moreover, the term "C#+ hydrocarbons" is meant to describe all hydrocarbon molecules having # or more carbon atoms. Accordingly, the term "C9+ hydrocarbons" is meant to describe a mixture of hydrocarbons having 9 or more carbon atoms. The term "C9+ alkanes" accordingly relates to alkanes having 9 or more carbon atoms.

The term "LPG" as used herein refers to the well-established acronym for the term "liquefied petroleum gas". LPG generally consists of a blend of C2-C4 hydrocarbons i.e. a mixture of C2, C3, and C4 hydrocarbons.

Accordingly, the process of the present invention involves contacting a hydrocarbon feed in the presence of hydrogen to a selective catalyst under specifically selected process conditions.

The hydrocarbon feed used in the process of the present invention comprises polyaromatics. The term "hydrocarbon feed" as used herein relates to the hydrocarbon mixture that is subjected to the process of the present invention. Preferably, the hydrocarbon feed used in the process of the present invention comprises at least 10 wt-% polyaromatics, more preferably at least 20 wt-% polyaromatics and most preferably at least 30 wt-% polyaromatics. Preferably, the hydrocarbon feed used in the process of the present invention is selected from the group consisting of heavy cycle oil, light cycle oil, carbon black oil, cracked distillate and pyoil.

The specifically selected process conditions used in the process of the present invention comprise a pressure of 65-150 bara, a temperature of 350-500° C., a WHSV of 0.1-10 h$^{-1}$ and a "hydrogen to hydrocarbon" ratio (H$_2$/HC ratio) of 1-20. Particularly the selection of the correct process pressure is critical to obtain the desired process products, i.e. the selective formation of LPG while avoiding the formation of BTX. If the pressure is too low, for instance less than 65 bara, the selectivity towards LPG decreases, while the selectivity towards BTX increases.

Preferably, the process conditions comprise a pressure of 70-120 bara. Selecting a process pressure of 70-120 bara was found to lead to a higher conversion of aromatic components into paraffins. Particularly in combination with a relatively low WHSV, preferably a WHSV of 1-3 h$^{-1}$ the LPG yield can be improved.

Preferably, the process conditions further comprise a temperature of temperature of 400-470° C., a WHSV of 1-3 h$^{-1}$ and a H$_2$/HC ratio of 3-10. Selecting a process temperature of 400-470° C. was found to lead to a further reduced fuel gas production due to reduced cracking of C3 and C4. Selecting a WHSV of 1-3 h$^{-1}$ was found to lead to an improved selectivity towards LPG and a reduced methane make. Selecting a H$_2$/HC ratio of 3-10 was found to reduce the formation of coke precursor species.

The selective catalyst used in the process of the present invention is described herein as M/zeolite catalyst, wherein said M/zeolite catalyst comprises 0.05-2.5 wt-% of element M, wherein said element M is one or more elements selected from Group 10 of the Periodic Table of Elements; and an aluminosilicate zeolite having a pore size of 6-8 Å and a SiO$_2$/Al$_2$O$_3$ ratio of 50-120.

Zeolites are well-known molecular sieves having a well-defined pore size. As used herein, the term "zeolite" or "aluminosilicate zeolite" relates to an aluminosilicate molecular sieve. An overview of their characteristics is for example provided by the chapter on Molecular Sieves in Kirk-Othmer Encyclopedia of Chemical Technology, Volume 16, p 811-853; in Atlas of Zeolite Framework Types, 5th edition, (Elsevier, 2001). Preferably, the catalyst comprises a large pore size aluminosilicate zeolite. Suitable zeolites include, but are not limited to, zeolite Y, faujasite (FAU), beta zeolite (BEA) and chabazite (CHA). The term "large pore zeolite" is commonly used in the field of zeolite catalysts. Accordingly, a large pore size zeolite is a zeolite having a pore size of 6-8 Å.

The aluminosilicate zeolite used in the process of the present invention has a SiO$_2$/Al$_2$O$_3$ ratio of 50-120. Means and methods for quantifying the SiO$_2$ to Al$_2$O$_3$ molar ratio of a zeolite are well known in the art and include, but are not limited to AAS (Atomic Absorption Spectrometer) or ICP (Inductively Coupled Plasma Spectrometry) analysis.

Preferably, the M/zeolite catalyst comprises an aluminosilicate zeolite having a SiO$_2$/Al$_2$O$_3$ ratio of 60-100. More preferably, the M/zeolite catalyst comprises an aluminosilicate zeolite having a SiO$_2$/Al$_2$O$_3$ ratio of 50-90. Selecting an aluminosilicate zeolite having a SiO$_2$/Al$_2$O$_3$ ratio of 60-100 is believed to improve the thermal stability of catalyst used in the process of the present invention and an improved selectivity towards LPG.

Accordingly, element "M" as used herein is one or more elements selected from Group 10 of the Periodic Table of Elements. Preferably, the M/zeolite catalyst comprises 0.5-2 wt-% of element M. All weight percentages of element M as provided herein relate to the amount of element M in relation to the total catalyst composition. Preferably, element M is one or more elements selected from the group consisting of Pd and Pt. Most preferably, element M is Pt.

The catalyst composition as used in the process of the present invention may comprise further components such as a binder. Known binders include, but are not limited to silica, alumina and clay, such as kaolin. Alumina (Al$_2$O$_3$) is a preferred binder. The catalyst composition of the present invention preferably comprises at least 10 wt-%, most preferably at least 20 wt-% binder and preferably comprises up to 40 wt-% binder.

The catalyst composition is preferably formed into shaped catalyst particles by any known technique, for instance by extrusion.

Preferably, the aluminosilicate zeolite has a 12-ring structure. These specific aluminosilicate zeolites are well known to the skilled man. An overview of their characteristics is for example provided by the Atlas of Zeolite Framework Types, 5th edition, (Elsevier, 2001). Accordingly, an aluminosilicate zeolite having a 12-ring structure is an aluminosilicate zeolite wherein the pore is formed by a ring consisting of 12 [SiO$_4$] or [AlO$_4$]$^+$ tetrahedra.

Preferably, the aluminosilicate zeolite is zeolite Y. Depending on the silica-to-alumina molar ratio ("SiO$_2$/Al$_2$O$_3$ molar ratio" or "SiO$_2$/Al$_2$O$_3$ ratio") of their framework, synthetic faujasite zeolites are divided into zeolite X and zeolite Y. In X zeolites the SiO$_2$/Al$_2$O$_3$ ratio is between 2 and 3, while in Y zeolites it is 3 or higher. Accordingly, zeolite Y is a synthetic faujasite zeolite having a SiO$_2$/Al$_2$O$_3$ ratio in their framework of 3 or more. Preferably, the zeolite in the selective alkylation catalyst is in the so-called hydrogen form, meaning that its sodium or potassium content is very low, preferably below 0.1, 0.05, 0.02 or 0.01 wt-%; more preferably presence of sodium is below detection limits.

Preferably, the zeolite Y is partially dealuminated. Preferably, the zeolite Y used in the process of the present invention has a SiO$_2$/Al$_2$O$_3$ ratio of 60-100. More preferably, the zeolite Y used in the process of the present invention has a SiO$_2$/Al$_2$O$_3$ ratio of 70-90. Preferably, the partially dealuminated zeolite is prepared by controlling SiO$_2$/Al$_2$O$_3$ ratio during zeolite synthesis. Alternatively, the zeolite may be partially dealuminated by a post-synthesis modification. Means and methods to obtain dealuminated zeolite by post-synthesis modification are well known in the art and include, but are not limited to the acid leaching technique; see e.g. Post-synthesis Modification I; Molecular Sieves, Volume 3; Eds. H. G. Karge, J. Weitkamp; Year (2002); Pages 204-255. The aluminosilicate zeolite may comprise super cages having a size of 12-14 Å. Means and methods for preparing zeolites comprising super cages are well-known in the art and comprise zeolite post-treatments such as acid leaching and steaming, among others. (Angew. Chem., Int. Ed. 2010, 49, 10074, ACS nano, 4 (2013) 3698).

The process of the present invention produces LPG as a process product. Preferably, the process of the present invention produces at least 70 wt-% LPG of the total hydrocarbon process product, more preferably at least 75 wt-% LPG of the total hydrocarbon process product, even more preferably at least 80 wt-% LPG of the total hydrocarbon process product and most preferably at least 85 wt-% LPG of the total hydrocarbon process product. Preferably, the process of the present invention produces less than 5 wt-% methane of the total hydrocarbon process product, more preferably less than 3 wt-% methane of the total hydrocarbon process product, even more preferably less than 2 wt-% methane of the total hydrocarbon process product and most preferably less than 1 wt-% methane of the total hydrocarbon process product.

It is noted that the invention relates to all possible combinations of features described herein, particularly features recited in the claims.

It is further noted that the term "comprising" does not exclude the presence of other elements. However, it is also to be understood that a description on a product comprising certain components also discloses a product consisting of these components. Similarly, it is also to be understood that a description on a process comprising certain steps also discloses a process consisting of these steps.

EXAMPLE

Catalyst Preparation

Physical Mixture Catalyst:

The physical mixtures of hydrogenation and solid acid catalysts are composed of commercially available catalyst samples. The hydrogenation catalyst is a $Pt/Al_2O_3$ from UOP, namely R-12. The zeolite is an unmodified zeolite Y from Zeolyst, namely CBV 780. These samples have been mixed in a 1 to 1 weight ratio.

Bifunctional Pt/Zeolite Y Catalyst:

65 grams of Zeolyst CBV 780 are divided into 3 ceramic dishes and calcined in air at 100° C. for 3 hours to 300° C. and then to 550° C. for 10 hours using a ramp rate of 3° C./min.

After calcination, 15 grams of pre-dried sample are dispersed in 1 liter of deionized water and stirred at 65° C. overnight. The next day the temperature is raised to 70° C. and a solution of 0.317 g of $Pt(NH_3)_4 (NO_4)_2$ is dissolved in 76.4 g of DI-H20 and added drop wise over a period of 7 hours. The material is allowed to stir overnight at 70° C. prior to filtering off the liquid. The filter cake is re-suspended in 1 liter of fresh DI-H20 and allowed to stir for 15 min and subsequently filtered again. The washing step is repeated twice more. The material is then allowed to dry overnight on filter paper at room temperature. Next, the material is dried at 80° C. for 3 hours, pressed (10,000 psi), crushed and sieved (35-60 mesh sizing scheme). The sized material is loaded in a tube furnace with an air flow rate of 2.2 L/min. The furnace is heated to 100° C. for 3 hours then to 300° C. for 3 hours at a ramp rate of 0.2° C./min. Subsequently, the material is further calcined to 350° C. at 0.2° C./min for 3 hours. The flows rates are then turned down to down to 1 L/min for 1 hour then to 345 ml/min for 1 hour while 350° C. is maintained. The material is then transferred to the calcination oven and calcined for 3 hours in air using the same ramp rate of 0.2° C./min.

Experimental Set-Up

The experimental program was conducted on a fully automated 16-fold trickle-flow hydro process unit allowing uninterrupted catalyst testing. The operating range of this unit is summarized in Table.

The 16-fold trickle-flow hydro processing unit operates as follows: The feed is preheated and mixed with hydrogen prior to entering the evaporation zone located on the top part of the set-up. Therein the mixture is heated to the selected reaction conditions. The pressure in the reaction section is maintained with a nitrogen pressure hold gas system (PHG) at the reactor outlet. The reactor section is composed of a 5 mm internal diameter tube with an isothermal zone of 50 mm at the highest operating temperature. Once the reaction has taken place the effluent is sent to a condenser kept at 75° C. Therein the gas is separated from the liquid and sent to an online GC (every 90 min). The liquid collected during reaction is stored and subsequently analyzed offline in a GC-MS. Both, the gas and liquid flows are precisely measured to obtain the combined effluent composition.

TABLE 1

16-fold trickle-flow hydro processing unit specifications.
Set-up specifications

| | |
|---|---|
| Temperature | up to 500° C. |
| Pressure | up to 100 bara |
| Operation mode | Trickle-bed |
| Catalysts volume | up to 1.92 ml |
| Reactor inner diameter | 5 mm |
| Gases | $H_2$, $N_2$, Ar |

Model Feed Composition

The experiments have been carried out with a synthetic feed composed of paraffin's (25 wt %), mono-aromatics (20 wt %), di-aromatics (55 wt %) and tri-aromatics (5 wt %). This is summarized in table 2.

TABLE 2

Model feed composition details.
Model Feed

| | |
|---|---|
| Decane | 25 wt % |
| Propylbenzene | 20 wt % |
| Naphthalene | 25 wt % |
| 1-Methylnaphthalene | 10 wt % |
| 2-Methylnaphthalene | 15 wt % |
| Anthracene | 2 wt % |
| Phenantrene | 3 wt % |

Catalyst Preparation and Reactor Loading:

The series of catalysts tested displayed different sizes and shapes. To minimize the influence of external mass transfer limitations and compare the intrinsic reactivity of each catalyst, similar sieved fractions were used. To this end, zeolite powders were bound with alumina sol, dried, calcined and sieved to the desired size. The zeolite containing samples (namely, solid acid catalysts and/or bifunctional catalysts) were mixed in a 7 to 3 ratio with Dispersal(R) and the resulting mixture mixed with water (1 to 5 ratio). Subsequently, the slurry was milled (5 min, 600 rpm), dried in a hot box (110° C., overnight), calcined in air (300° C., 6 h) and sieved to a target fraction of 125-160 μm. On the other hand, the hydrogenation catalysts were milled and sieved to the same target fraction as the zeolite containing samples.

The catalysts were loaded in the reactors together with silicon carbide diluent to form a bed which is ring shaped around a thermowell. A thorough calibration was performed to determine the isothermal zone of the 16 parallel reactor set-up under the temperature conditions tested.

Activation Protocol

The activation and soaking protocol details are summarized in Table 3. After loading the catalyst in the reactor the activation procedure is performed to reduce the metal particles contained in the catalyst. Subsequently, the hydrogen feed is replaced by a mixture of hydrogen and the hydrocarbon feed used in the experiments while the sample is heated up slowly to reaction conditions. This is the so-called soaking procedure.

TABLE 3

Activation and soaking protocol details.

| Activation procedure | | Soaking procedure | |
|---|---|---|---|
| Temperature | 60-400° C. | Temperature | 60° C. |
| Heating ramp | 1° C./min, 2 h hold at 400° C. | WHSV | 2 h$^{-1}$ |
| Purge step | N$_2$ during 10 min | Purge step | N$_2$ during 10 min |
| Reduction step | H$_2$ | H$_2$ flow | 10 (l/h) |
| | | Pressure | 30 bara |
| H2 flow | 41.5 (l/h) | Duration | 16 h |
| Pressure | 30 bara | | |
| Duration | 460 min + Cool down | | |

Experimental Results

The physical mixture catalyst and bifunctional Pt/Zeolite Y catalyst, all prepared as described herein above, were contacted with the model feed using the following reaction conditions: a WHSV of 2 h$^{-1}$, a temperature of 450° C., a H$_2$:HC ratio of 10 and a pressure of 60 bara or 100 bara. The process was performed in a continuous system that operated in steady state conditions. In Table 4 the experimental results are describes as as an average result of a measuring period of 24 h. Data were generated using GC-MS as described herein above.

TABLE 4

Experimental results (all data provided in wt % except when indicated otherwise)

| catalyst | Pressure | C1 | C2 | C3 | C4 | C5-C9 | Mono-aromatics | Total LPG |
|---|---|---|---|---|---|---|---|---|
| Pt/Zeolite Y | 60 bara | 0.8 | 3 | 28.1 | 47.6 | 5.7 | 3.2 | 78.7 |
| Physical mixture | 60 bara | 0.2 | 0.9 | 12 | 18 | 3.8 | 40.4 | 31 |
| Pt/Zeolite Y | 100 bara | 0.9 | 2.3 | 28.6 | 47.3 | 9.3 | 2.7 | 78.6 |
| Physical mixture | 100 bara | 0.3 | 1.7 | 16.9 | 29.3 | 6.3 | 27 | 52.2 |

The invention claimed is:

1. A process for producing LPG from a hydrocarbon feed comprising polyaromatics, the process comprising contacting the feed in the presence of hydrogen with a M/zeolite catalyst at a pressure of 65-150 bara, a temperature of 350-500° C., a WHSV of 0.1-10 h$^{-1}$ wherein said M/zeolite catalyst comprises
0.05-2.5 wt-% of element M, wherein said element M is one or more elements selected from Group 10 of the Periodic Table of Elements; and
an aluminosilicate zeolite having a pore size of 6-8 Å and a SiO$_2$/Al$_2$O$_3$ ratio of 50-120.

2. The process according to claim 1, wherein the process conditions comprise a pressure of 70-120 bara.

3. The process according to claim 2, wherein the process conditions further comprise a temperature of 400-470° C. and a WHSV of 1-3 h$^{-1}$.

4. The process according to claim 1, wherein the M/zeolite catalyst comprises an aluminosilicate zeolite having a SiO$_2$/Al$_2$O$_3$ ratio of 60-100.

5. The process according to claim 1, wherein the M/zeolite catalyst comprises 0.5-2 wt-% of element M.

6. The process according to claim 1, wherein element M is one or more elements selected from the group consisting of Pd and Pt.

7. The process according to claim 1, wherein the aluminosilicate zeolite has a 12-ring structure.

8. The process according to claim 1, wherein the aluminosilicate zeolite comprises super cages having a size of 12-14 Å.

9. The process according to claim 8, wherein the aluminosilicate zeolite is zeolite Y.

10. The process according to claim 9, wherein the zeolite Y is partially dealuminated.

11. The process according to claim 1, wherein the hydrocarbon feed is selected from the group consisting of heavy cycle oil, light cycle oil, carbon black oil, cracked distillate and pyoil.

12. The process according to claim 1, wherein element M is Pt.

13. The process according to claim 12, wherein the hydrocarbon feed comprises at least 10 wt-% polyaromatics.

14. The process according to claim 13, wherein the aluminosilicate zeolite is zeolite Y.

15. The process according to claim 12, wherein the M/zeolite catalyst comprises 0.5-2 wt-% of Pt.

16. The process according to claim 1, wherein the hydrocarbon feed comprises at least 10 wt-% polyaromatics.

17. The process according to claim 1, wherein an amount of the LPG produced is at least 70 wt-% based on a total product.

18. The process according to claim 17, wherein an amount of methane produced is less than 1 wt-% based on a total product.

19. The process according to claim 1, wherein an amount of methane produced is less than 1 wt-% based on a total product.

* * * * *